United States Patent
Chen et al.

(10) Patent No.: US 8,081,490 B2
(45) Date of Patent: Dec. 20, 2011

(54) COMPUTER CHASSIS FOR MOUNTING MOTHERBOARD THEREIN

(75) Inventors: Yun-Lung Chen, Taipei Hsien (TW); Rui-Peng Shen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 334 days.

(21) Appl. No.: 12/503,515

(22) Filed: Jul. 15, 2009

(65) Prior Publication Data

US 2010/0265657 A1    Oct. 21, 2010

(30) Foreign Application Priority Data

Apr. 21, 2009   (CN) ...................... 2009 2 0302417 U

(51) Int. Cl.
 *H05K 7/02* (2006.01)
(52) U.S. Cl. ................ 361/807; 312/223.2; 165/104.22; 174/356
(58) Field of Classification Search ............... 312/223.2, 312/348.4; 165/108, 132, 104.22, 104.33, 165/80.4; 710/100, 104; 174/372, 356, 51; 454/184; 361/679.51, 679.54, 679.48, 679.02, 361/679.31, 679.4, 679.47, 679.58, 801, 361/829, 719
See application file for complete search history.

(56) References Cited

U.S. PATENT DOCUMENTS

| | | | | |
|---|---|---|---|---|
| 6,266,239 B1 * | 7/2001 | Cook et al. | ............... | 361/679.58 |
| 6,870,731 B2 * | 3/2005 | Lin et al. | ................... | 361/679.58 |
| 6,982,878 B2 * | 1/2006 | Chen et al. | ..................... | 361/801 |
| 7,027,306 B2 * | 4/2006 | Chen et al. | ..................... | 361/725 |
| 7,034,223 B2 * | 4/2006 | Fan et al. | ........................ | 174/51 |

* cited by examiner

*Primary Examiner* — Hung Duong
(74) *Attorney, Agent, or Firm* — Altis Law Group, Inc.

(57) ABSTRACT

An apparatus includes a computer chassis and a motherboard. The motherboard defines a mounting aperture and a securing hole. The mounting aperture includes a large hole and a small hole communicating with the large hole. The computer chassis includes a bottom plate which defines a screw hole therein. A first convex projection is formed on the bottom plate. A hollow pillar is formed on the first convex projection. The pillar defines a through hole extending through the pillar and the first convex projection. A blind rivet is mounted in the through hole. The blind rivet includes a cap located above the pillar. The cap has an area larger than the small hole. The motherboard is slidable between a first position and a second position. In the first position the motherboard is located on the first convex projection, the pillar extends in the large hole of the motherboard and the cap is positioned above the motherboard. In the second position the pillar is located in the small hole, the cap is misaligned with the large hole, the securing hole of the motherboard is aligned with the screw hole of the bottom plate.

10 Claims, 5 Drawing Sheets

COMPUTER CHASSIS FOR MOUNTING MOTHERBOARD THEREIN

BACKGROUND

1. Technical Field

The present embodiment relates to computer chassis, and particularly to a computer chassis that conveniently mounts a motherboard therein.

2. Description of Related Art

Conventionally, a motherboard is located on a plurality of standoffs of a computer chassis to electrically insulate the traces on the motherboard with the metal chassis. Many screws or bolts are used to secure the motherboard to the standoffs of chassis. However, when installing or removing the motherboard, a tool such as a screwdriver or a wrench is usually required and tightening or removing all of the fasteners is laborious and time-consuming.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
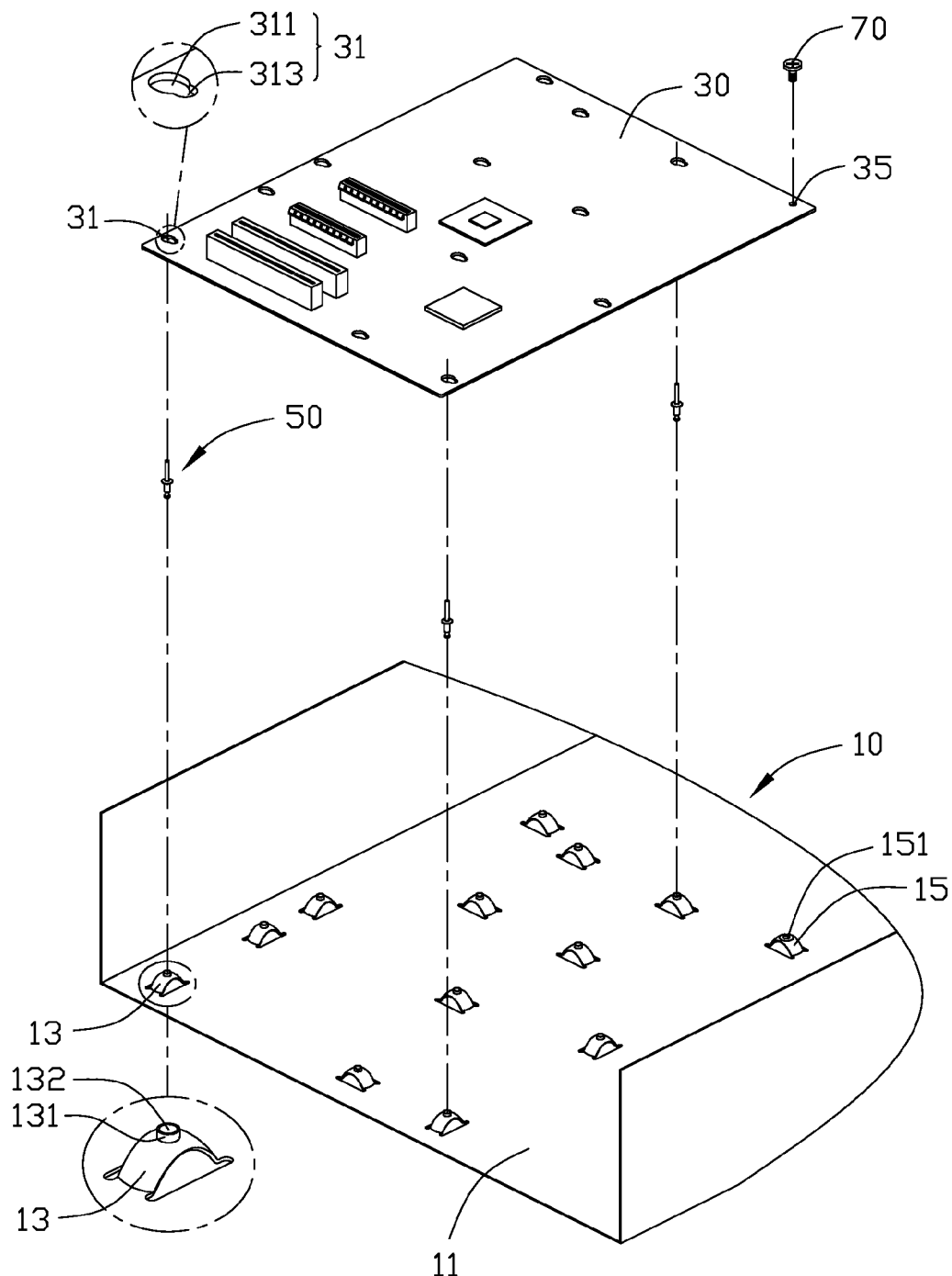
FIG. 1 is an exploded, isometric view of an embodiment of a computer chassis which includes a motherboard.

Referring to FIG. 1, a computer chassis 10 is configured to couple with a motherboard 30.

The computer chassis 10 includes a bottom plate 11. The bottom plate 11 has a plurality of first convex projections 13 and a second convex projection 15 protruded therefrom. A hollow pillar 131 is formed on each of the first convex projections 13. A through hole 132 is defined in the pillar 131. The through hole 132 extends through the pillar 131 and the first convex projection 13. The second convex projection 15 defines a screw hole 151 therein.

The motherboard 30 defines a plurality of mounting apertures 31 corresponding to the pillars 131 of the bottom plate 11. Each mounting aperture 31 has a large hole 311 and a small hole 313 communicating with the large hole 311. A diameter of the large hole 311 is larger than a diameter of the small hole 313. A diameter of the pillar 131 is smaller than the diameter of the small hole 313. The motherboard 30 defines a securing hole 35 corresponding to the screw hole 151 of the bottom plate 11.

Figure 2:
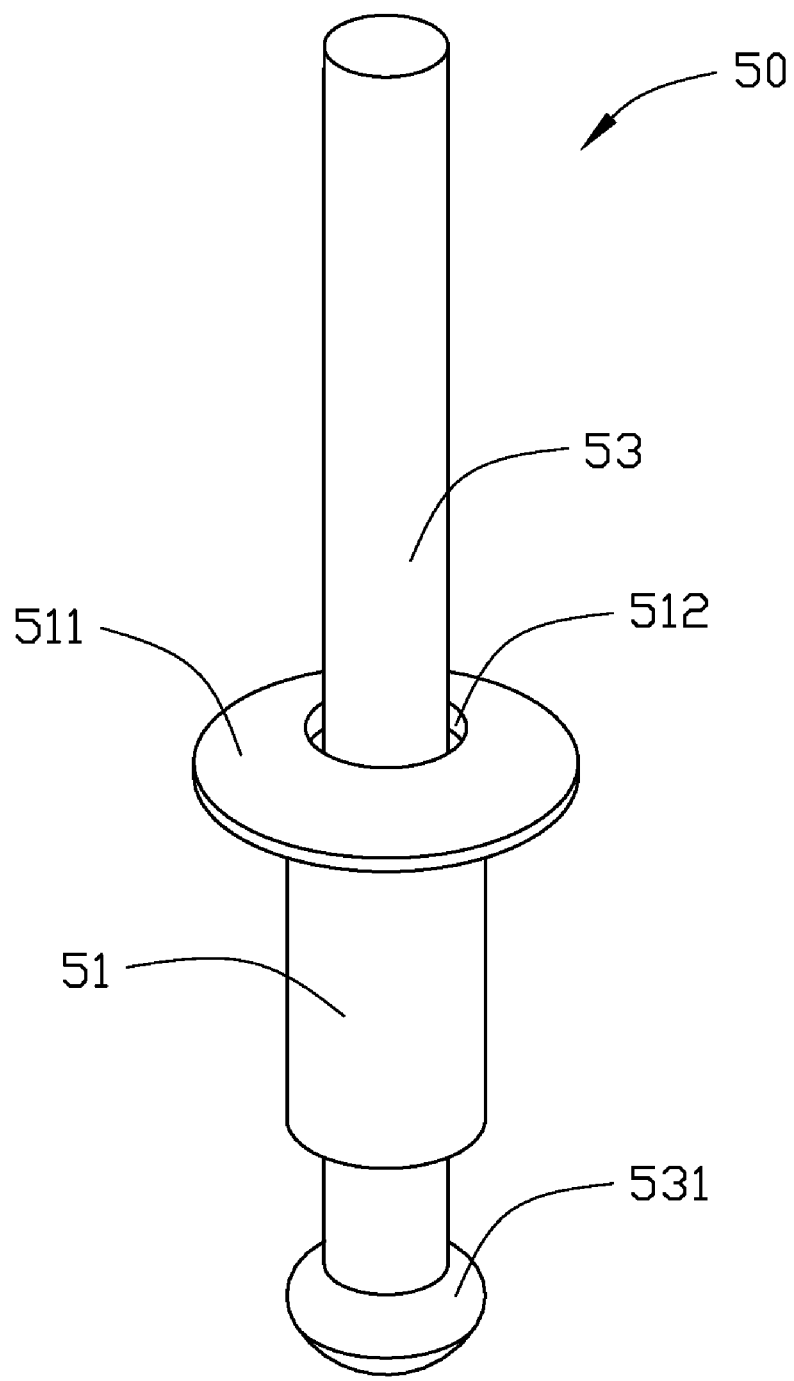
FIG. 2 is an isometric view of a blind rivet of the computer chassis of FIG. 1.

Referring to FIGS. 1 and 2, a plurality of blind rivets 50 is adapted to be mounted in the through holes 132 of the first convex projections 13. Each blind rivet 50 includes a sleeve 51 and a shank 53. The sleeve 51 defines a receiving hole 512 for receiving the shank 53 therein. A diameter of the sleeve 51 is smaller than a diameter of the through hole 132 of the pillar 131. A cap 511 extends from a top end of the sleeve 51. A diameter of the cap 511 is larger than the diameter of the through hole 132. The diameter of the cap 511 is also larger than the diameter of the smaller hole 313 of the mounting aperture 31, but smaller than the diameter of the large hole 311.

The shank 53 is a circular cylinder. A diameter of the shank 53 is smaller than a diameter of the receiving hole 512. An expansion portion 531 is formed at a bottom end of the shank 53. A size of the expansion portion 531 is larger than the diameter of the receiving hole 512, and also larger than the diameter of the through hole 132.

Figure 3:
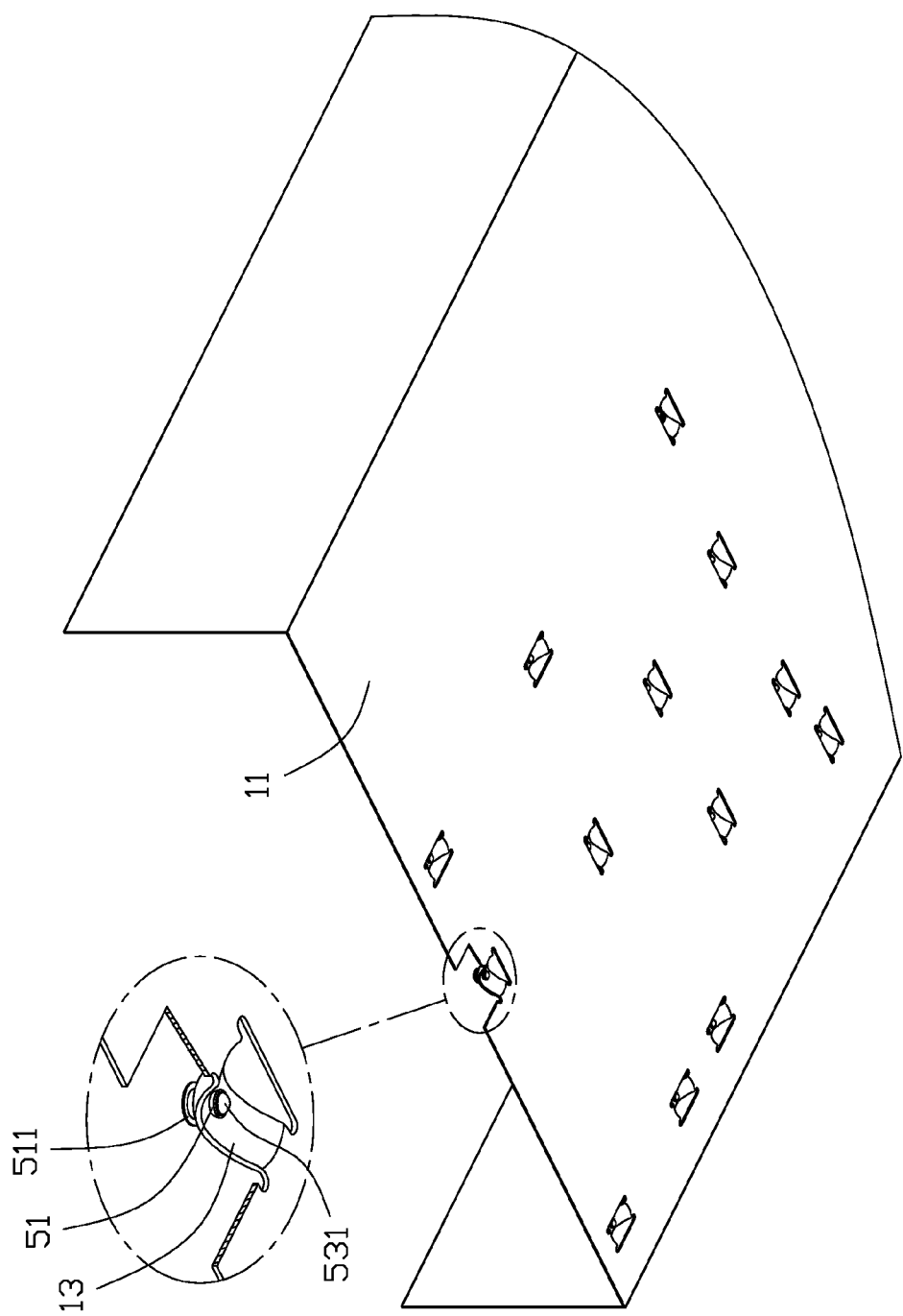
FIG. 3 is an isometric view of the blind rivet mounted on the computer chassis of FIG. 1.
Figure 4:
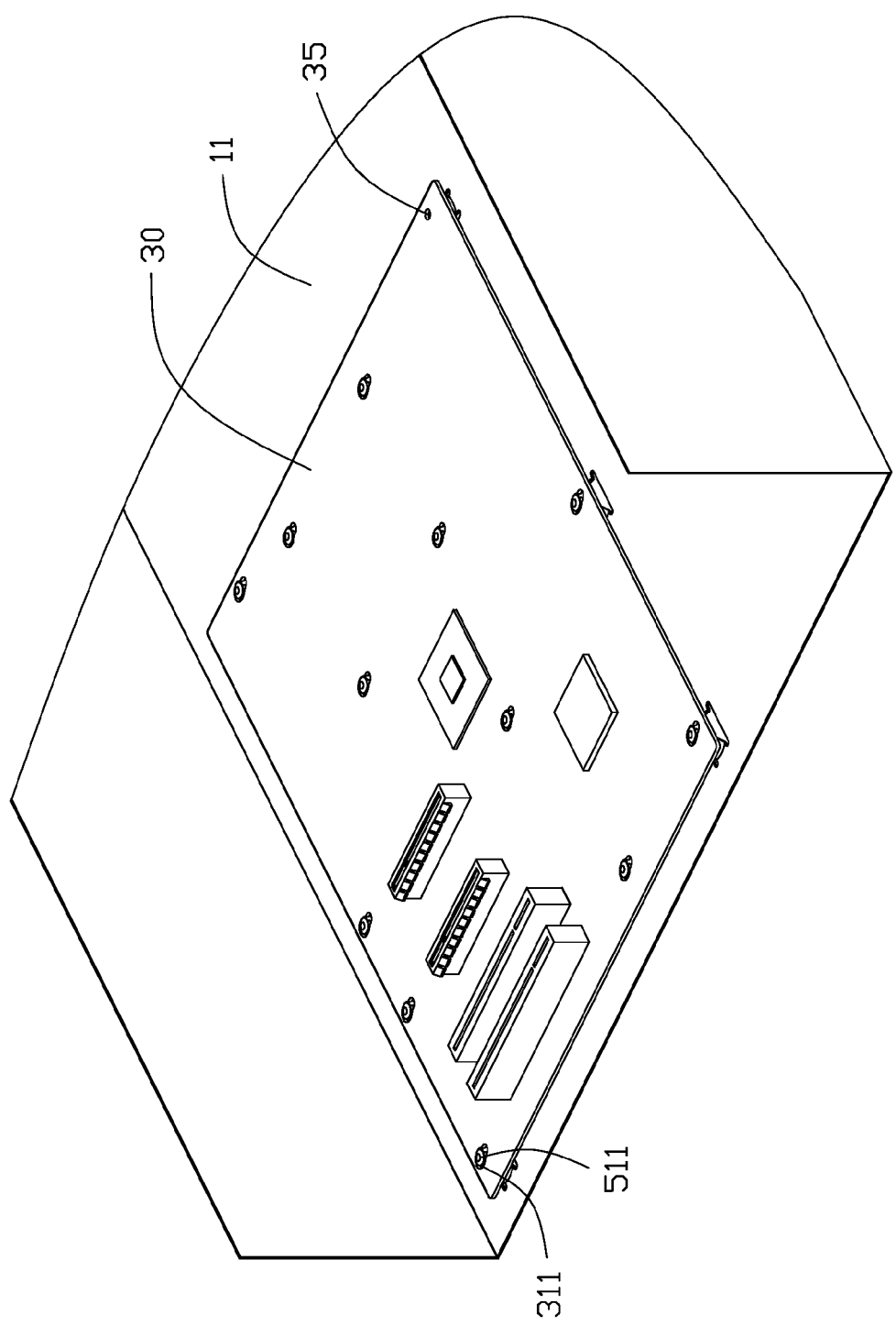
FIG. 4 is a part-assembled view of the computer chassis and the motherboard of FIG. 1.
Figure 5:
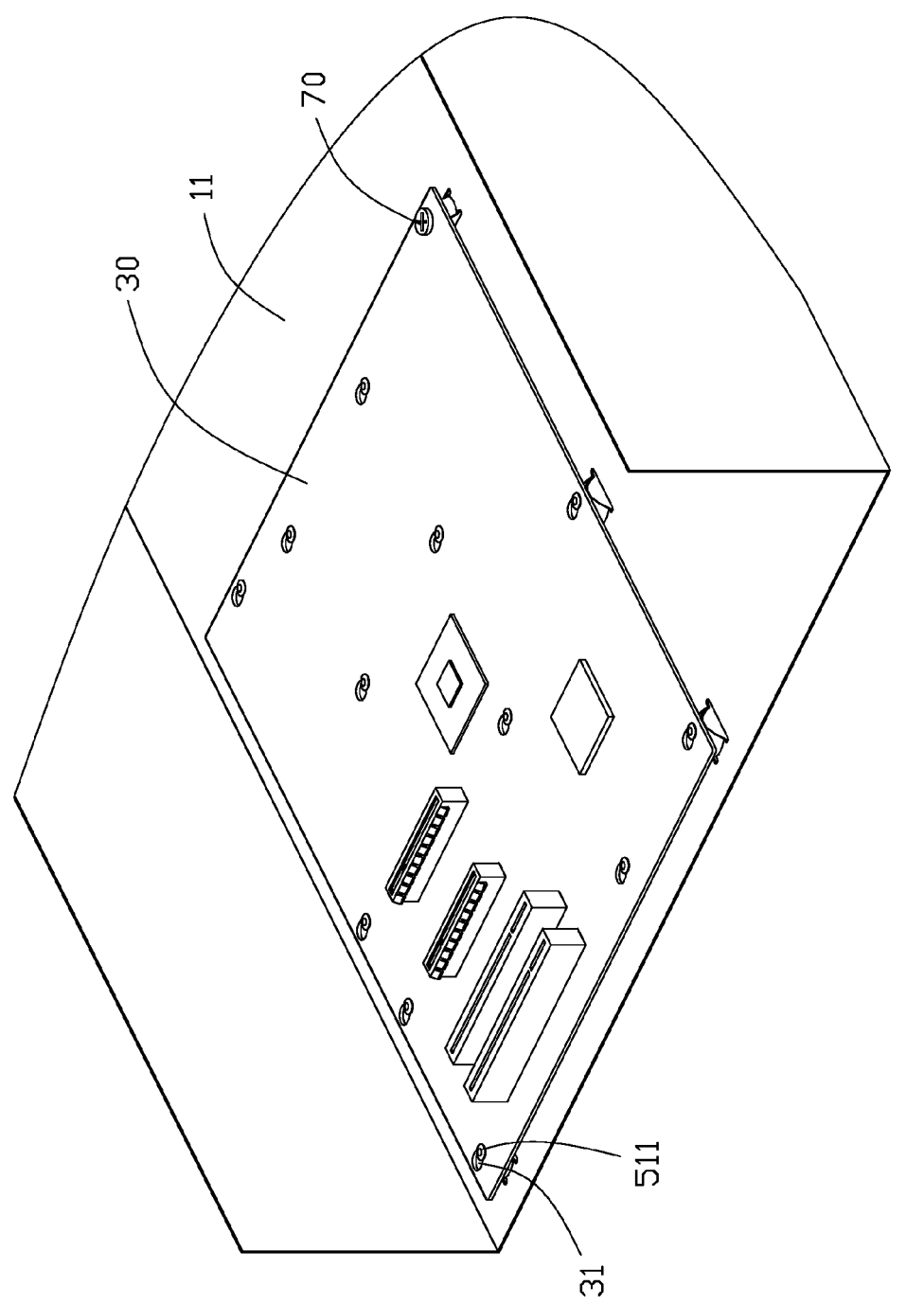
FIG. 5 is assembled view of the computer chassis and the motherboard of FIG. 1.

Referring to FIGS. 1 to 3, in assembly of the blind rivet 50 in the through hole 132 of the first convex projection 13, the sleeve 51 of the blind rivet 50 is inserted in the through hole 132 of the first convex projection 13 until the cap 511 resists a top end of the pillar 131. At this position, a bottom end of the sleeve 51 slightly extends out of the through hole 132. A top end of the shank 53, which does not form the expansion portion 531, is inserted in the receiving hole 512 of the sleeve 15 until the expansion portion 531 of the shank 53 resists the bottom end of the sleeve 51. At this position, the top end of the shank 53 is located above the first convex projection 13. The top end of the shank 53 is pulled upwardly to intrude the expansion portion 531 into the receiving hole 512 of the sleeve 51. The bottom end of sleeve 51 is expanded to receive and secure the expansion portion 531 of the shank 53 therein. Because the bottom end of the sleeve 51 is expanded, a portion of the sleeve 51, which is adjacent with the bottom end of the sleeve 51, is also expanded to be interferentially and firmly retained in the through hole 132 of the pillar 132. Therefore, the sleeve 51 is firmly mounted in the through hole 132. At last, a portion of the shank 53, which is positioned above the cap 511 of the sleeve 51, is cut off.

Referring to FIGS. 1 to 5, the mounting apertures 31 of the motherboard 30 are aligned with the pillars 131 of the first convex projections 13. Each pillar 131 and the sleeve 51 mounted thereon are inserted into the corresponding large hole 311 of the mounting aperture 31. The motherboard 30 is supported on the first convex projections 13. The pillar 131 is received in the large hole 311, and the cap 511 of the sleeve 51 is located above the motherboard 30. The motherboard 30 is then moved on the first convex projections 13. The pillar 13 slides into the small hole 313 of the mounting aperture 31. The cap 511 is misaligned with the large hole 311 and aligned with the small hole 313 to restrict the motherboard 30 on the first convex projections 13. At this position, the securing hole 35 of the motherboard 30 is aligned with the screw hole 151 of the second convex projection 15. A screw 70 extends through the securing hole 35, and is screwed in the screw hole 151 of the bottom plate 11 to mount the motherboard 30 on the bottom plate 11 of the chassis 10.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An apparatus comprising:
   a motherboard defining a mounting aperture and a securing hole therein, the mounting aperture comprising a large hole and a small hole communicating with the large hole; and a computer chassis comprising:
  a bottom plate defining a screw hole corresponding to the securing hole of the motherboard;
  a first convex projection formed on the bottom plate, a hollow pillar formed on the first convex projection, the pillar defining a through hole extending through the pillar and the first convex projection, a blind rivet mounted in the through hole, the blind rivet comprising a cap located above the pillar, the cap has an area larger than the small hole;
  wherein the motherboard is slidable between a first position and a second position; in the first position the motherboard is located on the first convex projection, the pillar extends in the large hole and the cap is positioned above the motherboard; in the second position the pillar is located in the small hole, the cap is misaligned with the large hole, the securing hole of the motherboard is aligned with the screw hole of the bottom plate.

2. The apparatus of claim 1, wherein a second convex projection protrudes from the bottom plate, and the screw hole is defined in the second convex projection.

3. The apparatus of claim 1, wherein the blind rivet comprises a sleeve and a shank, the shank comprises an expansion portion, the sleeve is received in the through hole of the pillar, the expansion portion is capable of causing the sleeve to deform.

4. The apparatus of claim 3, wherein the cap extends from a top end of the sleeve.

5. The apparatus of claim 4, wherein a diameter of the cap is larger than a diameter of the through hole, and the sleeve is inserted in the through hole until the cap resists a top end of the pillar.

6. An apparatus comprising:
  a motherboard defining a plurality of mounting apertures therein, each mounting aperture comprising a large hole and a small hole communicating with the large hole; and
  a computer chassis comprising:
    a bottom plate forms a plurality of first convex projections thereon, each first convex projection forming a pillar whose diameter is smaller than the diameter of the small hole, each pillar defining a through hole extending through the pillar and the first convex projections;
    a plurality of sleeves mounted in the through holes of the plurality of first convex projections, each sleeve comprising a bottom end and a top end, a cap formed on the top end of the sleeve, a diameter of the cap being larger than the small hole, the cap supported on the pillar, the bottom end of the sleeve being formed to be interferentially received in the through hole of the pillar;
    wherein the motherboard is slidable between a first position and a second position; in the first position the motherboard is located on the first convex projections, the pillars extend in the large holes and the caps are positioned above the motherboard, in the second position the pillars are located in the small holes, the caps are aligned with the small holes.

7. The apparatus of claim 6, wherein the motherboard defines a securing hole, the bottom plate defines a screw hole, the securing hole is aligned with the screw hole in the second position.

8. The apparatus of claim 7, wherein a second convex projection is protruded on the bottom plate, and the screw hole is defined in the second convex projection.

9. The apparatus of claim 6, wherein the sleeve defines a receiving hole, a shank is received in the receiving hole, the shank comprises an expansion portion is capable of being intruded in the sleeve to deform the sleeve.

10. The apparatus of claim 9, wherein the cap extends from a top end of the sleeve.

* * * * *